United States Patent
Han

(10) Patent No.: US 9,310,176 B2
(45) Date of Patent: Apr. 12, 2016

(54) METHOD OF MEASURING FLATNESS OF CHAMFERING TABLE

(71) Applicant: CORNING PRECISION MATERIALS CO., LTD., Gumi-si, Gyeongsangbuk-do (KR)

(72) Inventor: MyeongBo Han, Asan-si (KR)

(73) Assignee: CORNING PRECISION MATERIALS CO., LTD., ChungCheongNam-Do (KR)

( * ) Notice: Subject to any disclaimer, the term of this patent is extended or adjusted under 35 U.S.C. 154(b) by 198 days.

(21) Appl. No.: 14/288,445

(22) Filed: May 28, 2014

(65) Prior Publication Data
US 2014/0352163 A1 Dec. 4, 2014

(30) Foreign Application Priority Data
May 28, 2013 (KR) .................. 10-2013-0060440

(51) Int. Cl.
*G01B 5/20* (2006.01)
*G01B 3/10* (2006.01)

(52) U.S. Cl.
CPC ............... *G01B 3/1084* (2013.01); *G01B 5/20* (2013.01); *G01B 2003/1094* (2013.01)

(58) Field of Classification Search
CPC .................................. G01B 5/20; G01B 5/24
USPC ........................................................ 33/533
See application file for complete search history.

(56) References Cited

U.S. PATENT DOCUMENTS

| | | | | |
|---|---|---|---|---|
| 5,233,451 A * | 8/1993 | Iguchi | .................... | H01R 12/57 349/152 |
| 5,269,070 A * | 12/1993 | Thurston | ............ | G01B 11/2408 33/1 N |
| 5,706,568 A * | 1/1998 | Nenadic | .................... | B23C 3/12 144/135.2 |
| 5,738,563 A * | 4/1998 | Shibata | .................. | B23Q 15/02 451/256 |
| 5,752,797 A * | 5/1998 | Westerfield, Jr. | ......... | B23C 3/12 414/403 |
| 5,871,313 A * | 2/1999 | Nenadic | .................... | B23C 3/12 409/138 |
| 6,275,032 B1 * | 8/2001 | Iwata | ..................... | G01B 7/345 33/533 |
| 7,719,845 B1 * | 5/2010 | Jang | ................. | G06K 19/07732 174/521 |
| 2014/0352163 A1 * | 12/2014 | Han | ...................... | G01B 3/1084 33/533 |
| 2014/0357160 A1 * | 12/2014 | Han | .......................... | B24B 9/08 451/6 |

\* cited by examiner

*Primary Examiner* — Yaritza Gaudalupe-McCall
(74) *Attorney, Agent, or Firm* — McDermott Will & Emery LLP

(57) ABSTRACT

A method of measuring a flatness of a chamfering table includes the steps of positioning a substrate on the chamfering table, chamfering an edge of the substrate a plurality of times with a chamfering wheel while varying a relative height of the chamfering wheel with respect to a height of the substrate, locating symmetric chamfered points where the chamfered edge is top-bottom symmetric, matching values of the relative height of the chamfering wheel to the found symmetric chamfered points, and obtaining the flatness of the chamfering table from the values of the relative height of the chamfering wheel that are matched to the symmetric chamfered points.

7 Claims, 3 Drawing Sheets

METHOD OF MEASURING FLATNESS OF CHAMFERING TABLE

CROSS REFERENCE TO RELATED APPLICATION

The present application claims priority from Korean Patent Application Number 10-2013-0060440 filed on May 28, 2013, the entire contents of which are incorporated herein for all purposes by this reference.

BACKGROUND OF THE INVENTION

1. Field of the Invention

The present invention relates to a method of measuring the flatness of a chamfering table, and more particularly, to a method of measuring the flatness of a chamfering table, in which the flatness of the chamfering table can be provided as a quantized result.

2. Description of Related Art

In a plurality of fields, the edges of substrates are required to be chamfered. For instance, glass substrates which are used for flat panel displays, such as a liquid crystal display (LCD), a plasma display panel (PDP) and an electroluminescent display (ELD), can be manufactured by melting, shaping, cutting and chamfering processes. That is, it is possible to manufacture a glass substrate by melting a glass raw material, shaping molten glass into a plate by solidifying it, cutting the glass plate according to a predetermined size, and chamfering edges of the cut glass.

The edge of the substrate is chamfered in the state in which the substrate is placed on a chamfering table. It is preferred that the edge of the substrate be chamfered symmetrically in the top-bottom direction. However, when the chamfering table is not flat, an asymmetric chamfered point on the edge of the substrate is form, i.e. a localized area is asymmetrically chamfered.

Traditionally, when the substrate is asymmetrically chamfered, an operation of replacing a component of a device which fixes the asymmetric chamfered portion of the substrate or precisely adjusting the local height of the chamfering table using a thin steel piece is carried out. However, quantized compensation cannot be carried out, since it is impossible to determine in practice how much the chamfering table is deformed. Accordingly, there is a problem in that the labor of workers and time are lost due to the result of the operation since trials and errors are repeatedly carried out.

The information disclosed in the Background of the Invention section is only for better understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide a method of measuring the flatness of a chamfering table, in which the flatness of the chamfering table can be monitored and the result can be displayed as a quantized result.

In an aspect of the present invention, provided is a method of measuring a flatness of a chamfering table. The method includes the following steps of: positioning a substrate on the chamfering table; chamfering an edge of the substrate a plurality of times with a chamfering wheel while varying a relative height of the chamfering wheel with respect to a height of the substrate; locating symmetric chamfered points where the chamfered edge is top-bottom symmetric, and matching values of the relative height of the chamfering wheel to the found symmetric chamfered points; and obtaining the flatness of the chamfering table from the values of the relative height of the chamfering wheel that are matched to the symmetric chamfered points.

According to embodiments of the present invention, it is possible to monitor the flatness of the chamfering table and express the result in quantized values. In particular, the present invention makes it possible to promptly determine the degree of deterioration of the chamfering table which is continuously deteriorated by the repeated chamfering operation, and to directly take necessary measures. This has an advantage of being capable of minimizing labor and time loss, thereby improving the efficiency of the chamfering operation. In particular, the present invention can automate the operation of measuring the flatness, thereby removing the load of the operation pertaining to measurement.

In addition, according to embodiments of the present invention, it is possible to indirectly measure the flatness of the chamfering table instead of directly measuring it. The operation of directly measuring the flatness of the chamfering table is a dangerous operation which must be carried in the middle of equipment after the production line is momentarily stopped. The present invention can minimize the time for which the equipment stays stopped (a time required for machining about 10 substrates: 5 minutes) and protect a worker from a dangerous environment.

Furthermore, since the flatness of the chamfering table is defined with respect to the chamfering wheel, or the subject that conducts the chamfering operation, it is possible to reflect the shaking of the chamfering wheel in the up and down direction as an error factor. It is therefore possible to promptly find and understand any phenomenon which has an effect on quality after the chamfering, and to directly take necessary measures.

In addition, when separate measuring equipment is used, a measurement error may occur since a measuring point by the measuring equipment may be misaligned from an actual point that is chamfered by the chamfering wheel. In contrast, the present invention can prevent such a measurement error by defining the flatness with respect to the chamfering wheel.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
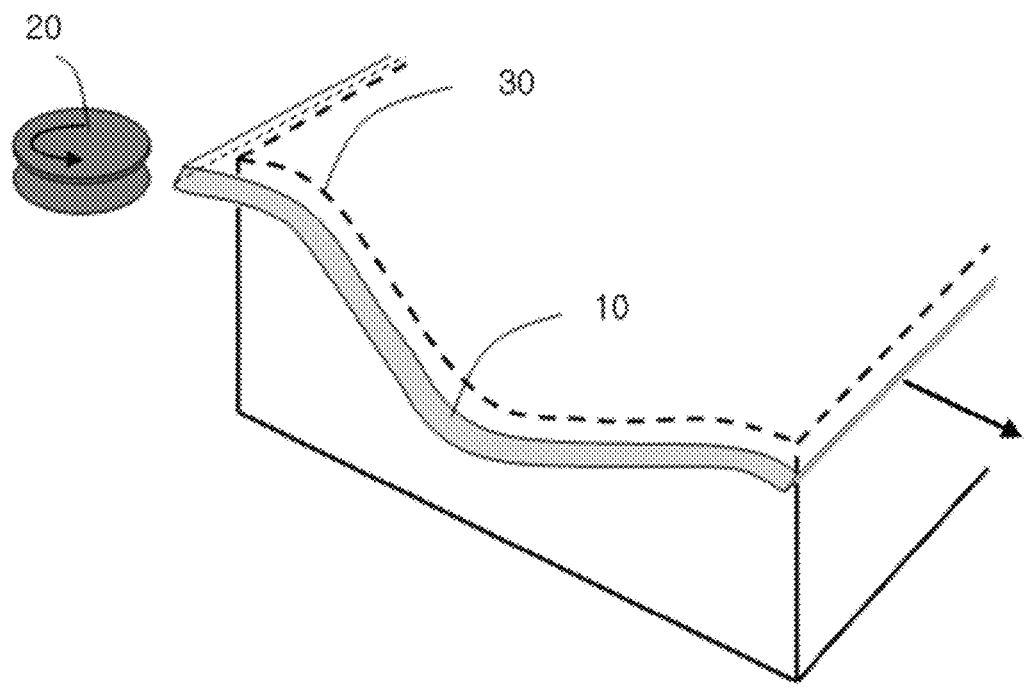
FIG. 1 is a schematic view showing the process of chamfering one edge of a substrate.

Reference will now be made in detail to various embodiments of the present invention, examples of which are illustrated in the accompanying drawings and described below, so that a person having ordinary skill in the art to which the present invention relates can easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

FIG. 1 is a schematic view showing the operation of chamfering one edge of a substrate.

The substrate 10 is placed on a chamfering table 30. Herein, the terms "up (upward)," "down (downward)," "left" and "right" are used to describe the positional relationship but not to indicate the absolute position with respect to the surface of the earth. Therefore, the description that the substrate 10 is positioned on or above the chamfering table 30 merely means that the substrate 10 is positioned in a direction that is designated to be upward from the chamfering table 30, but the upward direction does not necessarily indicate that it faces away from the surface of the earth. While the substrate 10 may be a glass substrate for a display device, the present invention is not limited thereto. The substrate 10 according to the present invention can be made of any material as long as the substrate is supposed to be chamfered.

The chamfering wheel 20 is made of a material that is more rigid than the substrate 10. When the object to be chamfered is the glass substrate 10, the chamfering wheel 20 typically contains diamond grinding chips. In general, the chamfering wheel 20 is provided as a disk type. Concave grooves are formed in the outer circumference of the chamfering wheel 20 along the circumferential direction thereof. The inner sides of the grooves abut against the edge of the substrate 10, thereby evenly chamfering the edge of the substrate 10. The chamfering wheel 20 is grasped by a dedicated grinding machine and is thereby rotated at a high speed.

In general, the substrate 10 is moved and the chamfering wheel 20 is rotated in position. However, this is not intended to be limiting. For instance, the arrangement in which the substrate 10 is fixed and the chamfering wheel 20 is movable is possible, or the arrangement in which both the substrate 10 and the chamfering wheel 20 are movable is possible. In response to the relative movement between the substrate 10 and the chamfering wheel 20, the chamfering wheel 20 chamfers the edge of the substrate 10 while moving along the edge.

Figure 2:
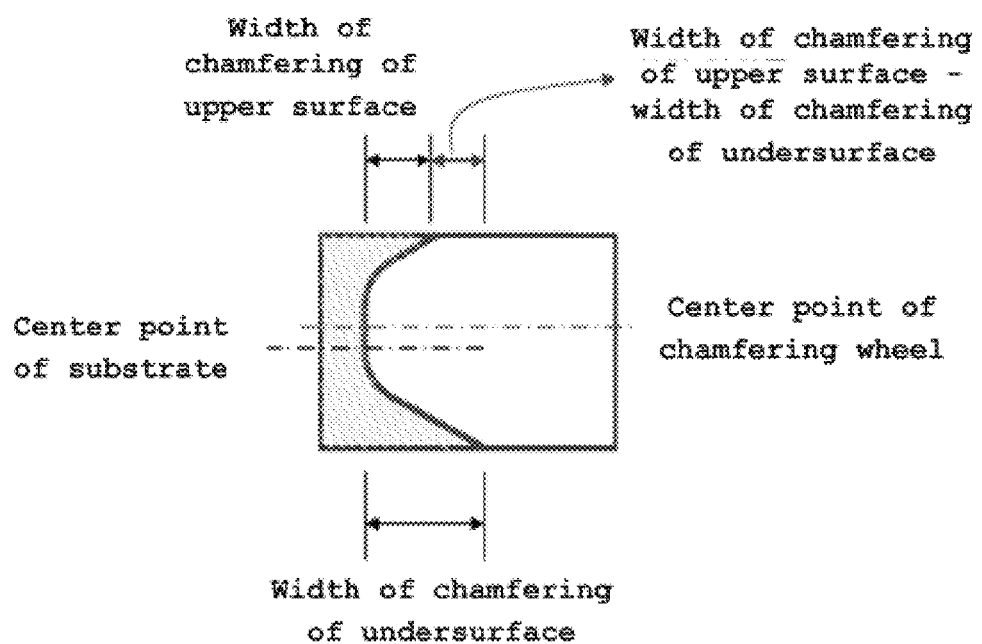
FIG. 2 is a side cross-sectional view showing an asymmetric variation of chamfering on one edge of a substrate.

FIG. 2 is a side cross-sectional view showing an asymmetric variation in chamfering on an edge of a substrate.

For instance, since a glass plate is thin (with a thickness of about 1 mm or less), it is bent along the shape of the upper surface of the chamfering table due to the flatness of the chamfering table and under the influence of the weight of the glass plate. In that state, the glass plate closely adjoins the upper surface of the chamfering table. Therefore, when the chamfering table 30 is not flat, the center point of the substrate 10 is locally misaligned from the center point of the chamfering wheel 20. When the local height of the chamfering table 30 is lower than a reference height, the center point of the edge of the substrate 10 is positioned lower than the center point of the chamfering wheel 20, as shown in FIG. 2. In this case, the undersurface of the substrate is more chamfered than the upper surface of the substrate, such that the chamfered width of the undersurface becomes greater than the chamfered width of the upper surface. In contrast, when the local height of the chamfering table 30 is greater than the reference height, the local center point of the cross-section at the edge of the substrate 10 is positioned higher than the center point of the chamfering wheel 20. In this case, the upper surface of the substrate is more chamfered than the undersurface of the substrate, such that the chamfered width of the upper surface becomes greater than the chamfered width of the undersurface.

Figure 3:
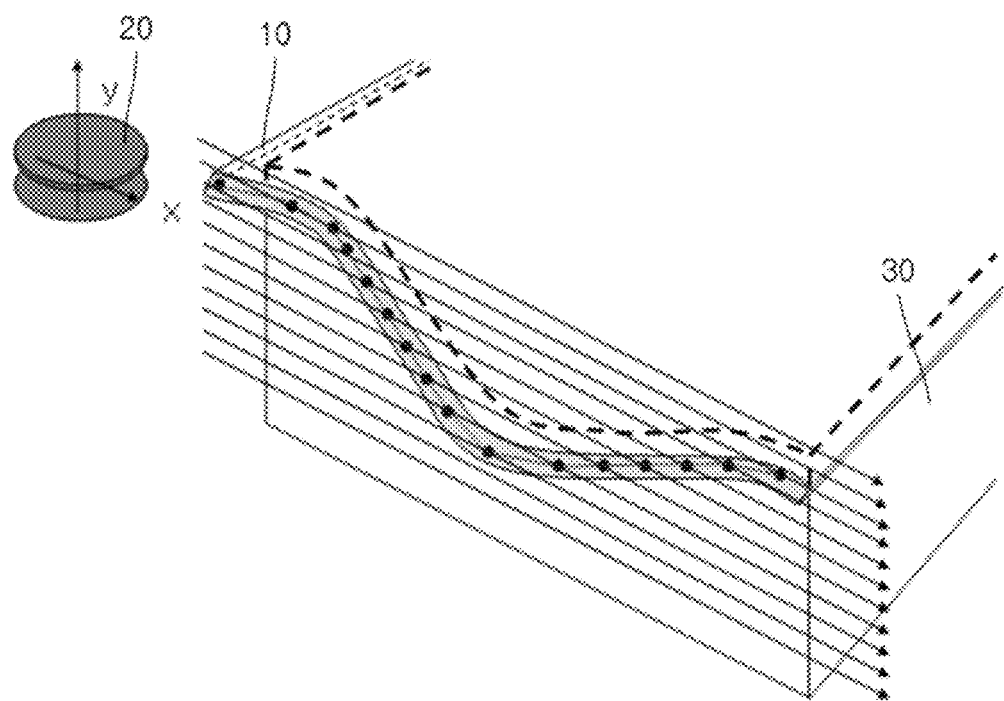
FIG. 3 is a schematic view showing a measuring method according to an embodiment of the present invention.

FIG. 3 is a schematic view showing a measuring method according to an embodiment of the present invention.

A substrate is chamfered by placing a chamfering wheel at a predetermined relative height. Herein, the term "relative height" indicates the relative height of the chamfering wheel with respect to a height of the substrate. As described above, it should be understood that the "height" is used in order to describe the relative positional relationship but not to indicate the absolute position. After the chamfering is finished, a symmetric chamfered point, i.e. a point on the edge of the substrate 10 which is symmetrically chamfered in the up and down direction, is located. According to an exemplary embodiment, the point where the chamfered width of the upper surface of the substrate 10 and the chamfered width of the undersurface of the substrate 10 are equal to each other is located as the symmetric chamfered point. However, the present invention is not limited thereto. For instance, it is possible to locate the symmetric chamfered point by directly inspecting the cross-section of the edge of the substrate 10 from the side. A variety of devices, such as a vision camera or a distance sensor, can be used to locate the symmetric chamfered point.

When each symmetric chamfered point is located, a value of the relative height of the chamfering wheel 20 is matched to the symmetric chamfered points. Here, while a worker can memorize the value of the relative height of the chamfering wheel 20 and the symmetric chamfered point or record them on a notebook by matching each value of the relative height to a corresponding symmetric chamfered point, the matching is preferably conducted with the help of a computer. In other words, it is preferred that a system be constructed such that, when a symmetric chamfered point is located, a relative height of the chamfering wheel 20 corresponding to the symmetric chamfered point is automatically inputted into the computer, thereby building up a database.

Here, according to an embodiment of the present invention, information which is to form the database includes positional information of each symmetric chamfered point, in particular, the x coordinate of the symmetric chamfered point and the y coordinate of the symmetric chamfered point. (The x axis extends in the direction of the edge of the substrate 10, and the y axis extends in the direction of the relative height of the chamfering wheel 20.)

In sequence, the edge of the substrate 10 is chamfered by varying the relative height of the chamfering wheel 20 with respect to a height of the substrate 10. While the edge of the same substrate 10 can be chamfered again, it is preferable to use another substrate 10. That is, the edge of a plurality of substrates 10 is chamfered while the relative height of the chamfering wheel 20 with respect to a height of each substrate 10 is changed.

Here, while the relative position may be varied by moving the chamfering wheel up and/or down, this is not intended to the limiting. For instance, it is possible to move the substrate up and/or down while fixing the chamfering wheel, or to move both the chamfering wheel and the substrate up and/or down.

As described above, the edge of the substrate is chamfered a plurality of times while the relative height of the chamfering wheel with respect to a height of the substrate is changed, symmetric chamfered points are located, and values of the relative height of the chamfering wheel are matched to the located symmetric chamfered points. When no more symmetric chamfered point is present at a specific value of the height, that value is recognized as the highest or lowest limit of the height. That is, the values of the relative height of the chamfering wheel 20 are required to be set such that no symmetric points are present between the highest limit and the lowest limit of the height.

Finally, the flatness of the chamfering table 30 is obtained from information pertaining to the symmetric chamfered points and the values of the relative height of the chamfering wheel 20 matched to the symmetric chamfered points.

For instance, after the chamfering step using the chamfering wheel, it is possible to locate the symmetric chamfered points using the vision camera and construct a system which automatically builds up a database based on information obtained from the symmetric chamfered points, thereby minimizing or removing the load of the operation pertaining to measurement.

Figure 4:
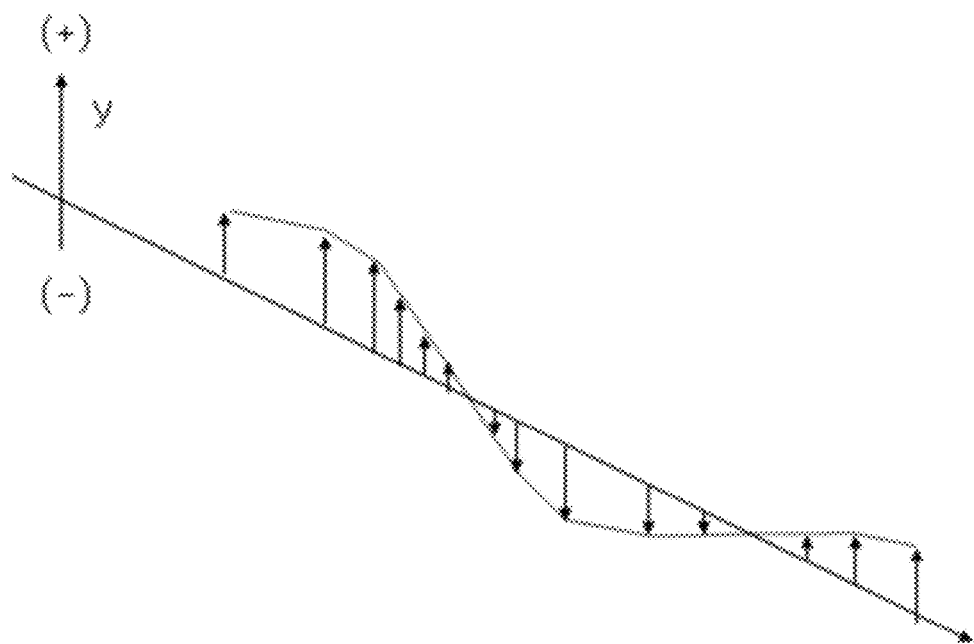
FIG. 4 is a graph showing measurements of the flatness of a chamfering table.

FIG. 4 is a graph showing measurements of the flatness of the chamfering table 30.

An approximate profile of the flatness of the chamfering table 30 can be obtained by connecting symmetric chamfered points with straight lines, interpolated curves or the like.

The foregoing descriptions of specific exemplary embodiments of the present invention have been presented with respect to the certain embodiments and drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

What is claimed is:

1. A method of measuring a flatness of a chamfering table, comprising:
   positioning a substrate on the chamfering table;
   chamfering an edge of the substrate a plurality of times with a chamfering wheel while varying a relative height with respect to a height of the substrate such that the chamfering wheel has different values of the relative height respective times;
   locating symmetric chamfered points where the chamfered edge is top-bottom symmetric, and matching the values of the relative height of the chamfering wheel to the located symmetric chamfered points; and
   obtaining the flatness of the chamfering table from the values of the relative height of the chamfering wheel that are matched to the symmetric chamfered points.

2. The method of claim 1, wherein locating the symmetric chamfered points comprises locating points where a chamfered width of an upper surface of the substrate is equal to a chamfered width of an undersurface of the substrate.

3. The method of claim 1, wherein the edges of a plurality of the substrates are chamfered respective times while varying the relative height of the chamfering wheel such that the chamfering wheel has the different values of the relative height for respective substrates.

4. The method of claim 1, wherein the values of the relative height of the chamfering wheel are set such that neither a highest value nor a lowest value of the relative height is matched to any of the symmetric chamfered points.

5. The method of claim 1, wherein the substrate comprises a glass substrate for a display.

6. The method of claim 1, wherein the flatness of the chamfering table is obtained from x coordinates of the symmetric chamfered points and y coordinates of the values of the relative height of the chamfering wheel, where an x axis extends in a direction of the edge of the substrate, and a y axis extends in a direction of the relative height of the chamfering wheel.

7. The method of claim 1, wherein the chamfering wheel has a concave groove in an outer surface of the chamfering wheel along a circumferential direction thereof.

\* \* \* \* \*